United States Patent
Chang et al.

(10) Patent No.: US 8,644,821 B2
(45) Date of Patent: Feb. 4, 2014

(54) METHOD OF BEACON SYNCHRONIZATION FOR BASE STATIONS

(71) Applicant: Taiwan Gomet Technology Co., Ltd, New Taipei (TW)

(72) Inventors: Sheng-Hsiung Chang, New Taipei (TW); Sheng-Yuan Chang, New Taipei (TW)

(73) Assignee: Taiwan Gomet Technology Co., Ltd., New Taipei (TW)

( * ) Notice: Subject to any disclaimer, the term of this patent is extended or adjusted under 35 U.S.C. 154(b) by 0 days.

(21) Appl. No.: 13/573,776

(22) Filed: Oct. 3, 2012

(65) Prior Publication Data
US 2013/0040674 A1 Feb. 14, 2013

Related U.S. Application Data

(63) Continuation-in-part of application No. 12/607,290, filed on Oct. 28, 2009, now Pat. No. 8,311,549.

(51) Int. Cl.
*H04W 4/00* (2009.01)

(52) U.S. Cl.
USPC .......................................... 455/434; 455/443

(58) Field of Classification Search
USPC ........................................ 455/448, 443, 434
See application file for complete search history.

(56) References Cited

U.S. PATENT DOCUMENTS

2008/0198826 A1* 8/2008 Won ............................. 370/338
2008/0240323 A1* 10/2008 Funato et al. ................. 375/362

* cited by examiner

*Primary Examiner* — Tu X Nguyen
(74) *Attorney, Agent, or Firm* — WPAT, P.C.; Anthony King

(57) ABSTRACT

The present invention discloses a method of beacon synchronization for base stations, which comprises the following steps: receiving or transmitting a beacon by a first base station or a second base station; scanning at least one channel by the second base station to search for a channel of the first base station; calculating a time difference between the beacon sent by the first base station and the beacon sent by the second base station; and adjusting a time of transmitting the beacon sent by the second base station to synchronize the beacon sent by the second base station with the beacon sent by the first base station. Wherein, a wireless signal of the second base station is interfered by the first base station.

9 Claims, 10 Drawing Sheets

METHOD OF BEACON SYNCHRONIZATION FOR BASE STATIONS

CROSS-REFERENCE TO RELATED APPLICATION

This application is a continuation-in-part of prior application Ser. No. 12/607,290, filed on Oct. 28, 2009. The patent application identified above is incorporated here by reference in its entirety to provide continuity of disclosure.

BACKGROUND OF THE INVENTION

1. Field of the Invention

The present invention relates to a wireless microphone system; in particular, the present invention relates to a wireless microphone system for synchronously receiving/transmitting wireless signals and a method thereof.

2. Description of Related Art

At present, police patrol cars and fire-engines are commonly equipped with the vehicle audio/video recording system for evidence collections which may include an analog or digital bidirectional wireless microphone system consisting of a base station and a wireless microphone, in which the base station is installed on the police patrol car or the fire-engine, while the wireless microphone is carried by a policeman, for example, so the policeman is able to communicate with the base station located on the vehicle through the wireless microphone, thereby recording the dialogs with people and nearby sounds in a recording equipment during operations. In case of installing two or more wireless microphone systems operating at the same frequency band on a patrol car, since the distances between each base station and the wireless microphone carried by different policemen may vary, the intensity of the received radio frequency (RF) signal may be different as well. If the difference between the intensities of the several generated RF signals becomes excessively significant, the base station working on weaker signals, upon reception of a signal transferred by a remote microphone, may be interfered and blocked by the electromagnetic waves emitted from the base station on the car which transmits stronger signals and operates at the same frequency band but in a different channel; hence, the base station having weaker signal intensity may not successfully receive the wireless microphone signal pertaining to it, causing undesirable operation failure.

Under such a condition, among these base stations a synchronization mechanism is required, such that the two wireless microphone systems are allowed to transmit and to receive the wireless signal at the same time, thereby preventing the problem of asynchronous signal transmissions and receptions which leads to an undesirable aftermath of mutual interference, thus facilitating normal operations for both wireless microphones.

SUMMARY OF THE INVENTION

With regards to the aforementioned conventional problems, the objective of the present invention is to provide a wireless microphone system and a method of signal synchronization thereof in order to address to the issues of operational abnormalities in the wireless microphone system due to signal interferences when two or more wireless microphones operating at the same frequency band are simultaneously used in the same area or on the same vehicle.

First of all, several terms illustrated in the present disclosure are defined as below:

"Beacon": the signal sent from a master base station, used as the basis of synchronization time correction for all slave base stations.

"Beacon Period": the time interval for each beacon transmitted by the master base station.

"Duration of Beacon Reception": a mechanism in which at least one beacon transmitted by the master base station must be received by the slave base stations within a duration of the multiple of a fixed beacon period (e.g., within a duration of ten beacon periods), thereby confirming the existence of the master base station so as to prevent erroneous determination about beacon offline due to some temporary interferences.

"Wait-Time Parameter": a crash-proof mechanism which indicates, after the slave base stations confirm the beacon is offline (the duration of beacon reception is overdue), an interval of time from this moment of confirmation to the instant that other slave base stations start to actively transfer the beacon. Since the wait-time parameter determined by each base station may be different, when the duration of beacon reception becomes overdue, other slave base stations will not transmit the beacon at the same time which is allowed to eliminate the crash problem, thereby assuring that only one base station can become the master base station.

According to an objective of the present invention, a wireless microphone system is provided, comprising a first base station and a second base station or more. The first base station receives or transmits a first channel wireless signal to a first wireless microphone by a first channel. The second base station receives or transmits a second channel wireless signal to a second wireless microphone by a second channel, and between the first base station and the second base station (or else a third base station or more) a beacon may be transmitted or received in a wireless communication, or the beacon may be transmitted or received by a wired physical connection. In case that any one of the base stations does not received any beacon for a duration of beacon reception, the base stations automatically switch to be the master base stations, and the master base stations start to send the beacon. When other base stations receive such a beacon, they switch to be the slave base stations and use the received beacon as the basis of synchronization time correction. The master base station, in accordance with the beacon, controls the slave base station such that the first base station and the second base station (or some nearby base stations) synchronously receive and synchronously transmit the wireless signal.

Herein when the first base station transmits the beacon, the first base station is the master base station, and the second base station or other base station is the slave base station.

Herein the first base station and the second base station may respectively have a first ID and a second ID which may be an internal code, a production serial number or a random code etc., individually for the first base station and the second base station.

Herein the microphone system further comprises a calculation unit which respectively calculates a first wait-time parameter or a second wait-time parameter based on the first ID or the second ID.

Herein the first base station, as the slave base station, is initially in a reception state during the duration of beacon reception, awaiting any beacon probably transmitted by other base stations on air; suppose no beacon is received during the duration of beacon reception, it determines that the master base station is offline, and from this moment the first base station becomes the master base station and, when the duration of beacon reception is overdue, starts to actively send the beacon to other slave base stations for use.

Herein in case that the first base station receives a beacon sent from a certain base station during the duration of beacon reception, the first base station is a slave base station, and simply receives the beacon transferred from the master base station rather than sending any beacon during the duration of beacon reception, until no other beacon is received when the duration of beacon reception is overdue; by then, the above-said step of actively sending the beacon is repeated.

Herein, when the first wait-time parameter and the second wait-time parameter are equal, the first base station and second base station are both the master base station in which the first base station and second base station transmit the beacon at the same time; but since the transfer/reception time for each base station is identical, no conflicts of asynchronous transfer/reception occur.

However, when the system becomes asynchronous because that errors existing therein result in difference in beacon transfer times of the first base station and the second base station, then the base station with longer transfer time will receive the beacon from the base station with shorter transfer time before its beacon is transmitted, so the slower base station automatically acts as the slave base station and accepts the control from the master base station.

According to another objective of the present invention, a method of signal synchronization is provided, comprising the following steps: receiving or transmitting a first channel wireless signal to at least one first wireless microphone through a first base station by a first channel; receiving or transmitting a second channel wireless signal to at least one second wireless microphone through a second base station by a second channel; next, coupling the first base station and the second base station or more by a wired connection for transmitting or receiving a beacon; finally, controlling a slave base station through a master base station such that the first channel wireless signal on the first channel and the second channel wireless signal on the second channel are synchronously received or synchronously transmitted.

Herein, if none of the base stations receive the beacon in the ""Duration of Beacon Reception, one of the base station switches to be the master base station and the master base station starts to transmit the beacon; meanwhile, once the aforesaid beacon is received, the other base stations which are still in the wait-time switch to be the slave base stations.

Herein, the wireless synchronization signal is transmitted or received to all base stations installed on the vehicle through a physical "synchronous signal line", and one of the base stations acts as the master base station to transmit the high quality and stable synchronization beacon to other slave base stations via the synchronous signal line as the basis for correcting the transfer/reception time synchronization in other base stations.

The differences between wireless and wired synchronization operations lie in that:

A. the wireless synchronization operation is not limited to multiple wireless microphone systems installed on one single vehicle; when other patrol cars installed with the same wireless system approach within a range and the interference of asynchronous reception/transfer occurs, the base stations installed thereon automatically participate in such a synchronization mechanism, thus allowing only one master base station to transfer the synchronization beacon to the slave base stations located in other different cars, thereby eliminating the problem of mutual interference;

B. the wired synchronization operation can only allow the base stations mutually connected on the same vehicle with a view to providing the beacon efficiently and stably.

But the aforementioned two mechanisms may be individually applied, or employed in combination for conjunctive and complementary effects.

Another objective of the present invention is to provide a method of beacon synchronization for base stations in order to address to the issues of operational abnormalities in the wireless microphone system due to signal interferences when two or more base stations operating at the similar frequency band are simultaneously used in the same area or on the same vehicle.

According to the another objective of the present invention, a method of beacon synchronization for base stations is provided, comprising the following steps: receiving or transmitting a beacon by a first base station or a second base station; scanning at least one channel by the second base station to search for a channel of the first base station; calculating a time difference between the beacon sent by the first base station and the beacon sent by the second base station; and adjusting a time of transmitting the beacon sent by the second base station to synchronize the beacon sent by the second base station with the beacon sent by the first base station. Wherein, a wireless signal of the second base station is interfered by the first base station.

Preferably, the step of scanning is performed every a plurality of beacon periods.

Preferably, the method of beacon synchronization is stopped in response to no beacon being found by the second base station in a consecutive search for predetermined beacon periods.

Preferably, a channel frequency of the first base station is lower or higher than a channel frequency of the second base station.

Preferably, the step of scanning is scanned from the channel with a lowest channel frequency to the channel with a highest channel frequency in the at least one channel.

Preferably, the method of beacon synchronization may further comprise a step of confirming and tuning a synchronization between the beacon of the first base station and the beacon of the second base station every predetermined beacon periods after the beacon sent by the second base station being synchronized with the beacon sent by the first base station.

Preferably, the second base station checks the presence of the first base station at the channel frequency of the first base station in response to that the first base station leaves or switches to another channel frequency.

Preferably, the method of beacon synchronization may further comprise a step of scanning from a channel of the second base station to another channel of the second base station in response to that the second base station is not capable of finding the first base station in the predetermined beacon periods.

Preferably, the method of beacon synchronization may further comprise a step of scanning from a channel with the lowest channel frequency available for the second base station to a previous channel of the second base station in response to that the second base station is not capable of finding the first base station in the predetermined beacon periods.

Preferably, the method of beacon synchronization may further comprise a step of scanning from a channel with the highest channel frequency available for the second base station to a next channel of the second base station in response to that the second base station is not capable of finding the first base station in the predetermined beacon periods.

In summary of the above-illustrated descriptions, the wireless microphone system and the method of signal synchronization thereof provides one or more of the following advantages:

(1) the wireless microphone system and the method of signal synchronization thereof according to the present invention eliminates the occurrence of abnormal operations caused by wireless electromagnetic wave interferences in the wireless microphone systems working at the same frequency band;

(2) the wireless microphone system and the method of signal synchronization thereof according to the present invention allows to synchronously receive or synchronously transmit all wireless signals within a range by controlling the slave base station through the master base station;

(3) the wireless microphone system and the method of signal synchronization thereof according to the present invention enables prevention of mutual interference in wireless electromagnetic waves due to neighboring installations of base stations operating at two or more identical frequency bands;

(4) the use of wired or wireless synchronization mechanisms can be individually applied, or otherwise employed in combination for conjunctive and complementary effects.

DETAILED DESCRIPTION OF THE PREFERRED EMBODIMENTS

In the following embodiments, installation of two base stations on one police patrol car is taken as an example for the purpose of illustration; but in practice, the number of the base station is by no means limited to two.

First of all, several terms illustrated in the present disclosure are defined as below:

"Beacon": the signal sent from a master base station, used as the basis of synchronization time correction for all slave base stations.

"Beacon Period": the time interval for each beacon transmitted by the master base station.

"Duration of Beacon Reception": a mechanism in which at least one beacon transmitted by the master base station must be received by the slave base stations within a duration of the multiple of a fixed beacon period (e.g., within a duration of ten beacon periods), thereby confirming the existence of the master base station so as to prevent erroneous determination about beacon offline due to some temporary interferences.

"Wait-Time Parameter": a crash-proof mechanism which indicates, after the slave base stations confirm the beacon is offline (the "Duration of Beacon Reception" is overdue), an interval of time from this moment of confirmation to the instant that other slave base stations start to actively transfer the beacon. Since the "Wait-Time Parameter" determined by each base station may be different, when the "Duration of Beacon Reception" becomes overdue, other slave base stations will not transmit the beacon at the same time which is allowed to eliminate the crash problem, thereby assuring that only one base station can become the master base station.

Figure 1:
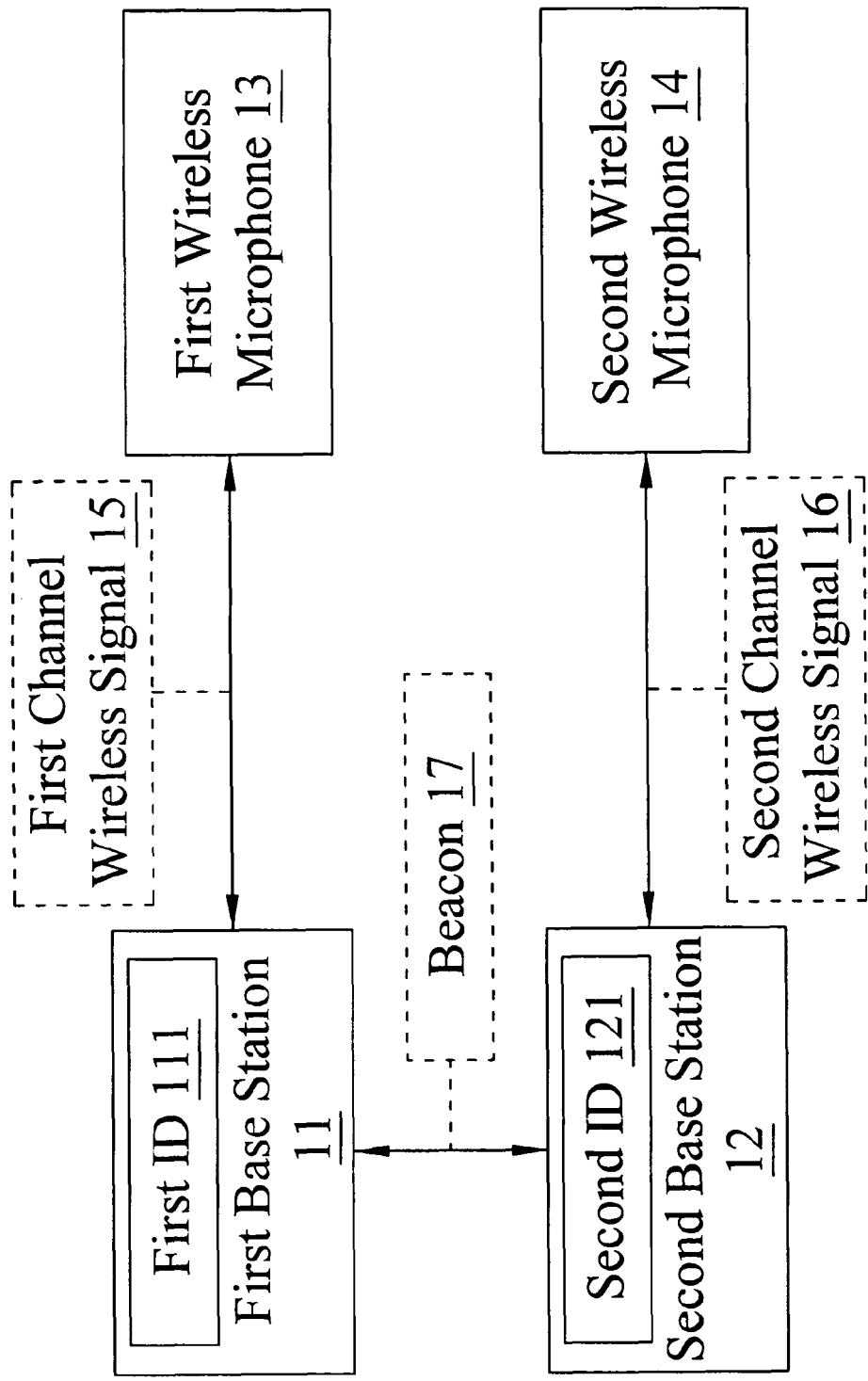
FIG. 1 is a diagram of the wireless microphone system according to the present invention.

Refer now to FIG. 1, wherein a diagram of the wireless microphone system according to the present invention is shown. In the Figure, the wireless microphone system 1 comprises a first base station 11, a second base station 12, a first wireless microphone 13 and a second wireless microphone 14. The first base station 11 receives or transmits a first channel wireless signal 15 to the first wireless microphone 13 by the first channel, while the second base station 12 receives or transmits a second channel wireless signal 16 to the second wireless microphone 14 by the second channel. The first base station 11 and the second base station 12 may transmit or receive the beacon 17 in a wireless communication or a wired physical connection, wherein the wireless communication may be accomplished by means of a radio frequency module, and the wired physical connection may be done through a synchronization signal line. The first base station 11 may transmit the beacon 17 to the second base station 12 or more base stations at a fixed time (beacon period), and the second base station 12 is also allowed to transmit the beacon 17 to the first base station 11 as well as other base stations, so it is able to determine that whether the first base station or the second base station is the master base station or the slave base station respectively in accordance with the transfer or reception of the beacon 17.

When the beacon 17 is transmitted from the first base station 11 to the second base station 12, the first base station 11 is determined as the master base station and the second base station 12 as the slave base station. Therefore, the first base station 11 may consistently transmit the beacon 17 to the second base station 12, while the second base station 12 may continuously receive the beacon 17 as well, in this way the first wireless signal 15 and the second wireless signal 16 may be appropriately adjusted for synchronous reception or synchronous transfer based on the beacon 17. Similarly, when the beacon 17 is transferred from the second base station 12 to the first base station 11, the second base station 12 is determined as the master base station and the first base station 11 as the slave base station. Consequently, the second base station 12 may consistently transfer the beacon 17 to the first base station 11, and the first base station 11 may continuously receive the beacon 17 from the second base station 12 as well, so the effect of synchronous signal reception or synchronous signal transmission may be also achieved.

Each base station has a different "wait-time parameter" for beacon transfer or reception, and such a parameter may be generated with various methods. The example set forth hereunder is simply one among others; in the example, a machine identification code (or production serial number) is used as a constant which is applied in a mathematical formula, and the value thus generated may be used as the "wait-time parameter" of each base station for transmitting the beacon 17.

The first base station 11 has a first ID 111, and the second base station 12 has a second ID 121. The first ID 111 and the second ID 121 may be different ID's, such that the first base station 11 and the second base station 12 have different wait-time parameters. Herein the system uses a calculation unit to convert the first ID 111 and the second ID 121 into a first wait-time parameter and a second wait-time parameter, and such the first wait-time parameter and the second wait-time parameter may act as the prefix time parameter for the transfer of the beacon 17.

In case the first base station 11 does not receive any beacon 17 from other base stations for the "duration of beacon reception", the first base station 11 switches from the slave base station to be the master base station so as to transfer the beacon 17 to the second base station 12. Similarly, suppose the second base station 12 does not receive any beacon 17 sent from other base stations for the "duration of beacon reception", the second base station 12 switches from the slave base station to be the master base station thereby transferring the beacon 17 to other base stations. As a result, before transferring the beacon 17, the first base station 11 or the second base station 12 needs to be in a reception state so as to receive the beacon 17.

For example, both base stations start up at the same time; suppose the wait-time parameter of the first base station 11 is 0.1 second and the wait-time parameter of the second base station 11 is 0.2 second, with a beacon period of 1 second, and the first base station 11 does not received any beacon 17 for a 10-second "Duration of Beacon Reception" equal to ten beacon periods, the first base station 11 switches to be the master base station, waiting for 0.1 second and then starting to transfer the beacon 17 to other base stations. At this moment, the second base station 12, after such "Duration of Beacon Reception", is also ready to switch to be the master base station; however, since the "Wait-Time Parameter" thereof is 0.2 second, before transferring the beacon 17, it receives the beacon 17 from the first base station 11, thus automatically switching to be the slave base station. Due to different time parameters in the first base station 11 and the second base station 12, the first base station 11 and the second base station 12 will not transfer the beacon 17 at the same moment. Furthermore, when a base station has a smaller ID, its "Wait-Time Parameter" becomes shorter, and the possibility of becoming the master base station is accordingly higher.

Occasionally, after the operations of the calculation unit, the first base station 11 and the second base station 12 may also possibly have the same "Wait-Time Parameter", or else the difference in startup time may happen to cause the first base station 11 and the second base station 12 to transfer the beacon 17 at the same instant; under such a situation, the first base station 11 and the second base station 12 both become the master base station. Whereas since the first base station 11 and the second base station 12 both transfer the beacon 17 simultaneously and no time difference exists, asynchronous phenomenon will not occur. Still, after long-term operations, it is nonetheless possible to generate errors in beacon transfer times due to variations in system elements or other factors, and in this case, the slower base station will receive the beacon 17 from the other base station and switch itself to be the slave base station.

For example, when the first base station 11 receives the beacon 17 from the second base station 12 beforehand, the first base station 11 switches to be the slave base station, but the second base station 12 remains the master base station in order to continuously send the beacon 17. For the same reason, in case the second base station 12 receives the beacon 17 from the first base station 11 earlier, then the second base station 12 switches itself to be the slave base station and the first base station 11 remains its status of master base station thereby continuously transfer the beacon 17.

The system may also comprises a third base station or more, so the system may use the calculation unit to calculate the ID in order to determine which base station is entitled as the master base station. Suppose the first base station 11 has a shorter ID, accordingly a smaller "Wait-Time Parameter", the first base station 11 may act as the master base station, whereas the second base station 12 and the third base station become the slave base stations. In case the first base station 11 stops transferring the beacon 17 owing to shutdown, interference, out of the wireless application range or any other possible causes, thus the second base station 12 and the third base station do not receive any beacon 17 for the "Duration of Beacon Reception", the base station having a smaller "Wait-Time Parameter" may start to send the beacon 17 to create a new master base station in order to replace the previous master base station. Therefore, there exists only one master base station in the system to guide other slave base stations, thereby assuring normal operations in the wireless microphone system.

Figure 2:
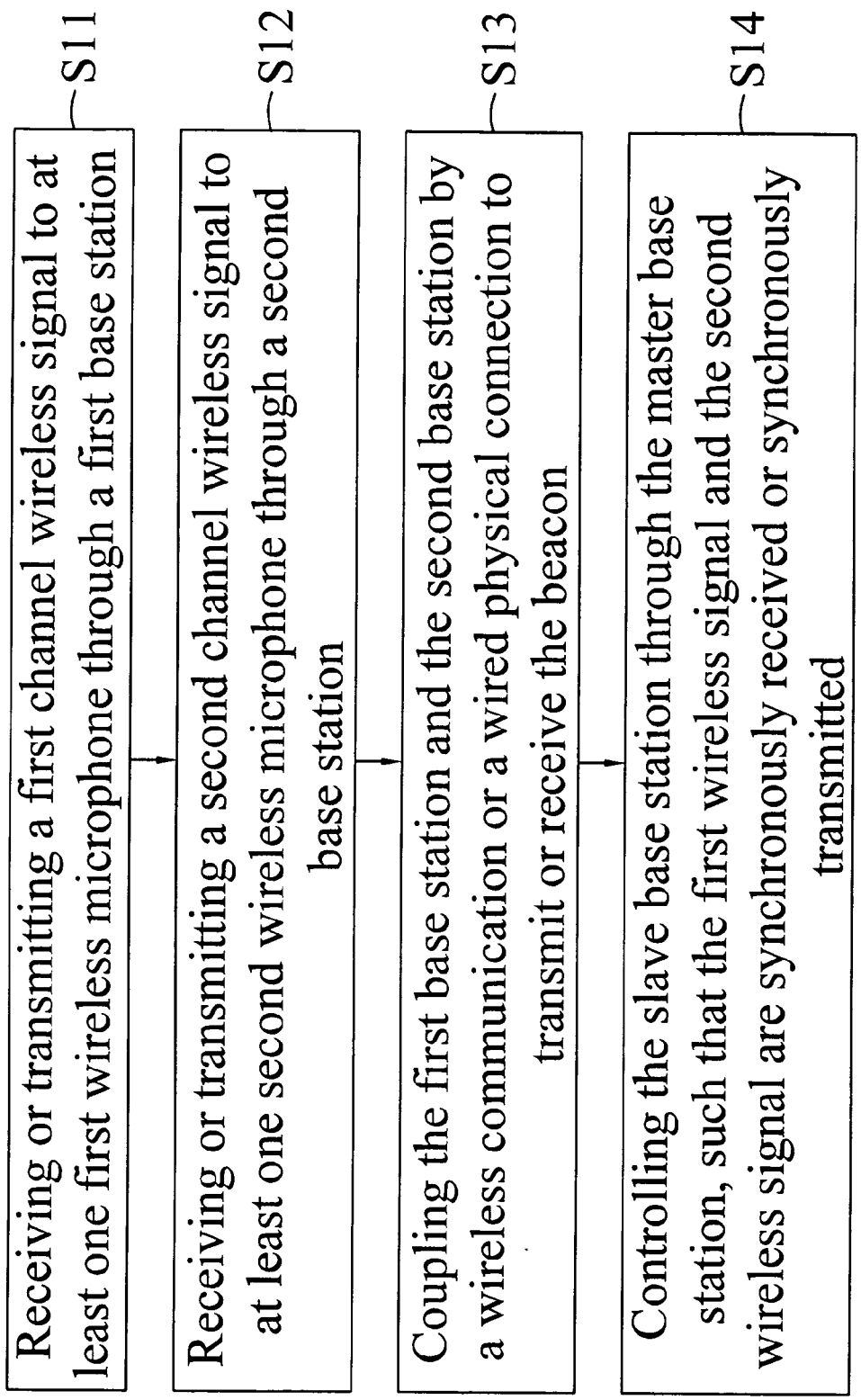
FIG. 2 is a flowchart for the method of signal synchronization for the wireless microphone according to the present invention.

Refer now to FIG. 2, wherein a flowchart for the signal synchronization method of the wireless microphone according to the present invention is shown, comprising the following steps: at Step S1, receiving or transmitting a first channel wireless signal to at least one first wireless microphone through a first base station by a first channel; at step S2, receiving or transmitting a second channel wireless signal to at least one second wireless microphone through a second base station by a second channel; at step S3, coupling the first base station and the second base station by a wireless communication or a wired physical connection for transmitting or receiving the beacon; at step S4, controlling the slave base station through the master base station, such that the first channel wireless signal and the second channel wireless signal are synchronously received or synchronously transmitted; wherein when no beacon is received by the first base station and the second base station, the first base station or the second base station switches to be the master base station, thus the first base station or the second base station starts to transfer the beacon, and upon reception of the beacon by the first base station or the second base station, the first base station or the second base station becomes the slave base station to receive the beacon. Wherein when the beacon is received by the first base station and the second base station, the first base station and the second base station switch to be the slave base stations.

In an embodiment, the first base station and the second base station both transfer the beacon simultaneously and no time difference exists so that asynchronous phenomenon and interference will not occur. Still, after long-term operations, it is nonetheless possible to generate errors in beacon transfer times due to variations in system elements or other factors. Thus, a method of beacon synchronization is provided in the present invention to adjust the time of transmitting the beacon in the base station being interfered so that the beacon will be synchronized without interfering with each other.

For example, with reference to FIGS. 3-6 for schematic diagrams of the method of beacon synchronization for base stations and the steps of the method according to an embodiment of the present invention, the first base station BS1 and the second base station BS2 are both master base stations. Wherein, the first base station BS1 and the second base BS2 station are located in channel 3 CH3 and channel 5 CH5, respectively, i.e. in the different frequency bands.

Figure 3:
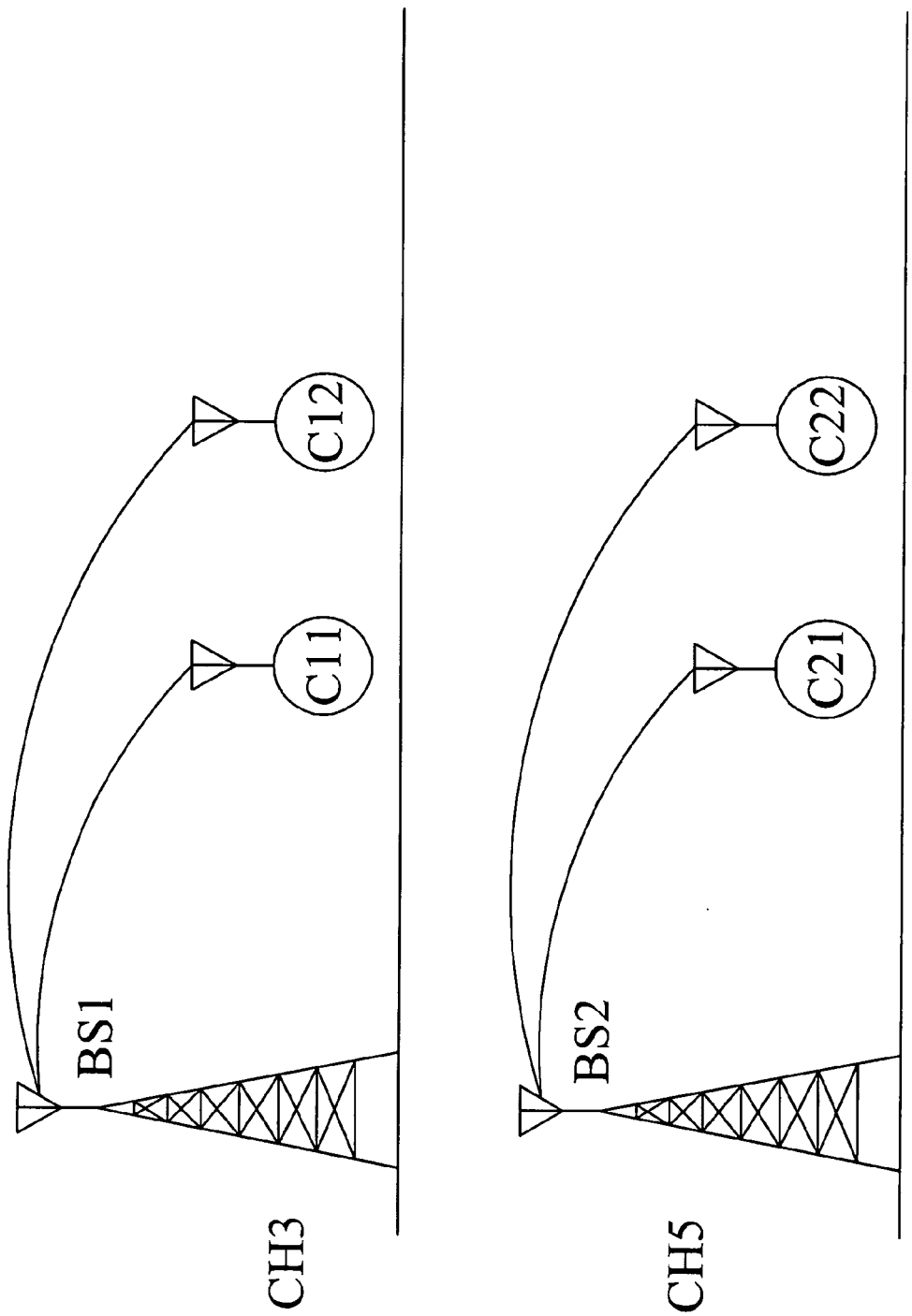
FIG. 3 is a schematic diagram of the method of beacon synchronization for base stations according to an embodiment of the present invention.
Figure 4:
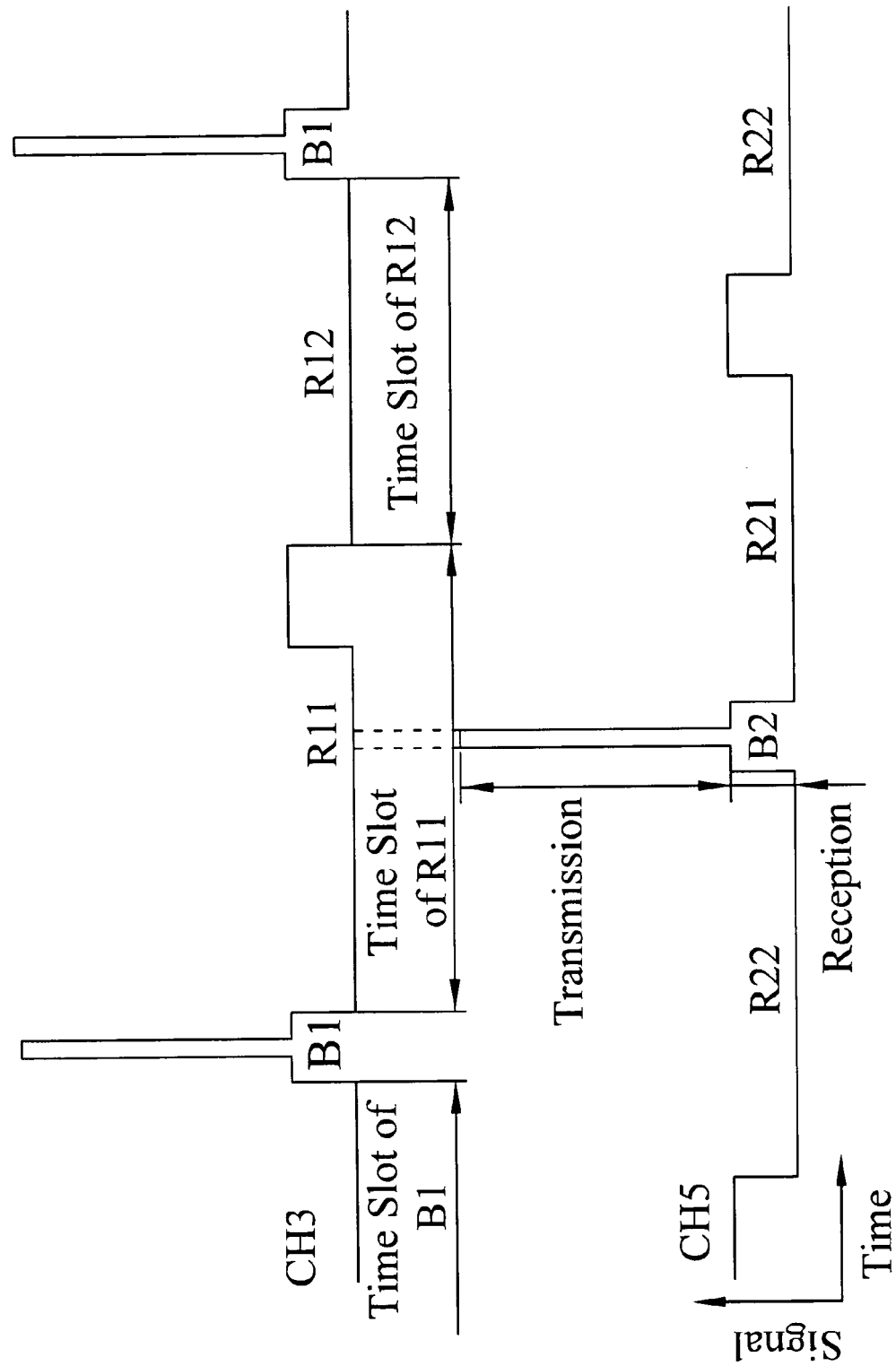
FIGS. 4-6 are schematic diagrams of the steps of the method of beacon synchronization for base stations according to an embodiment of the present invention.
Figure 5:
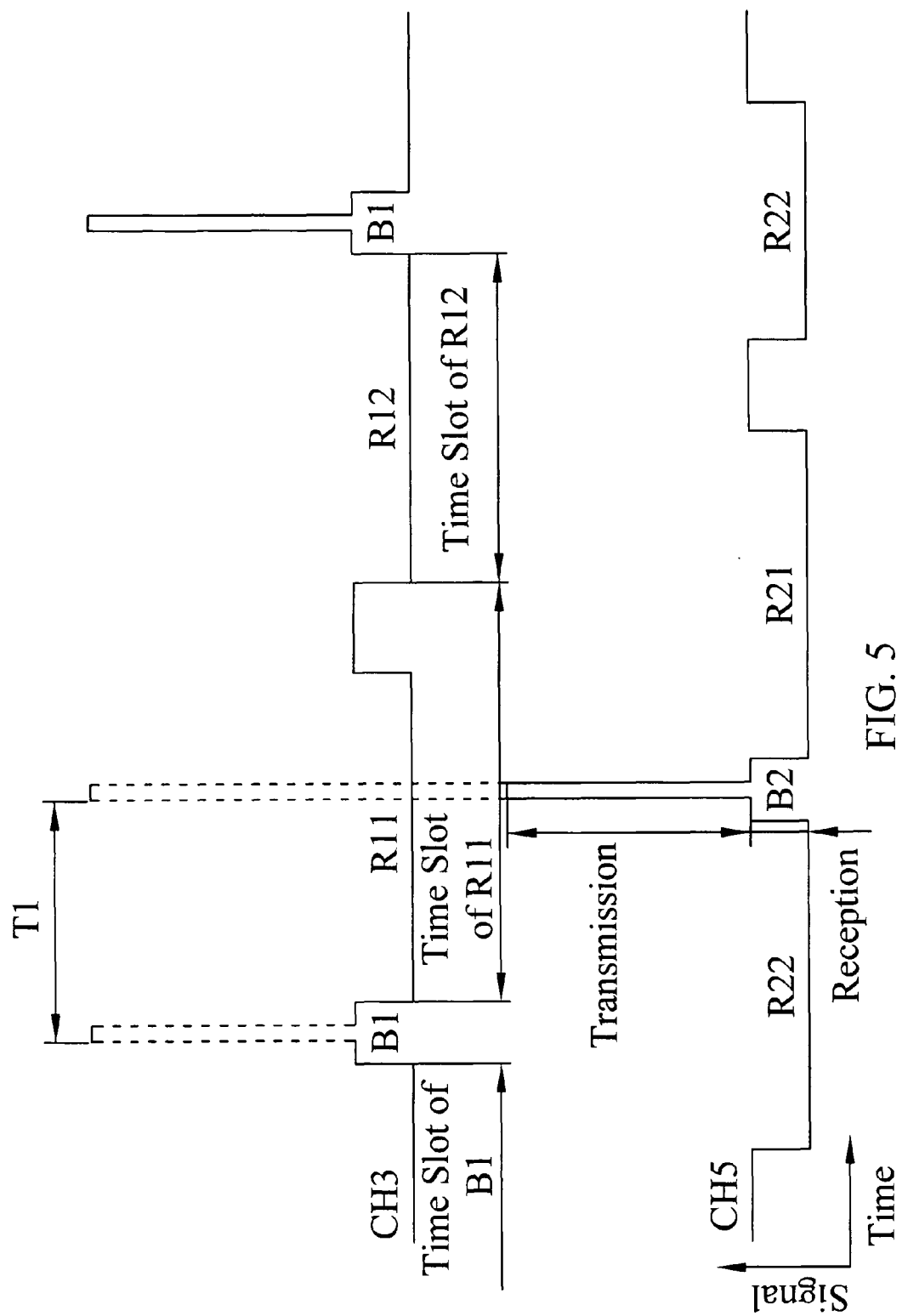
Figure 6:
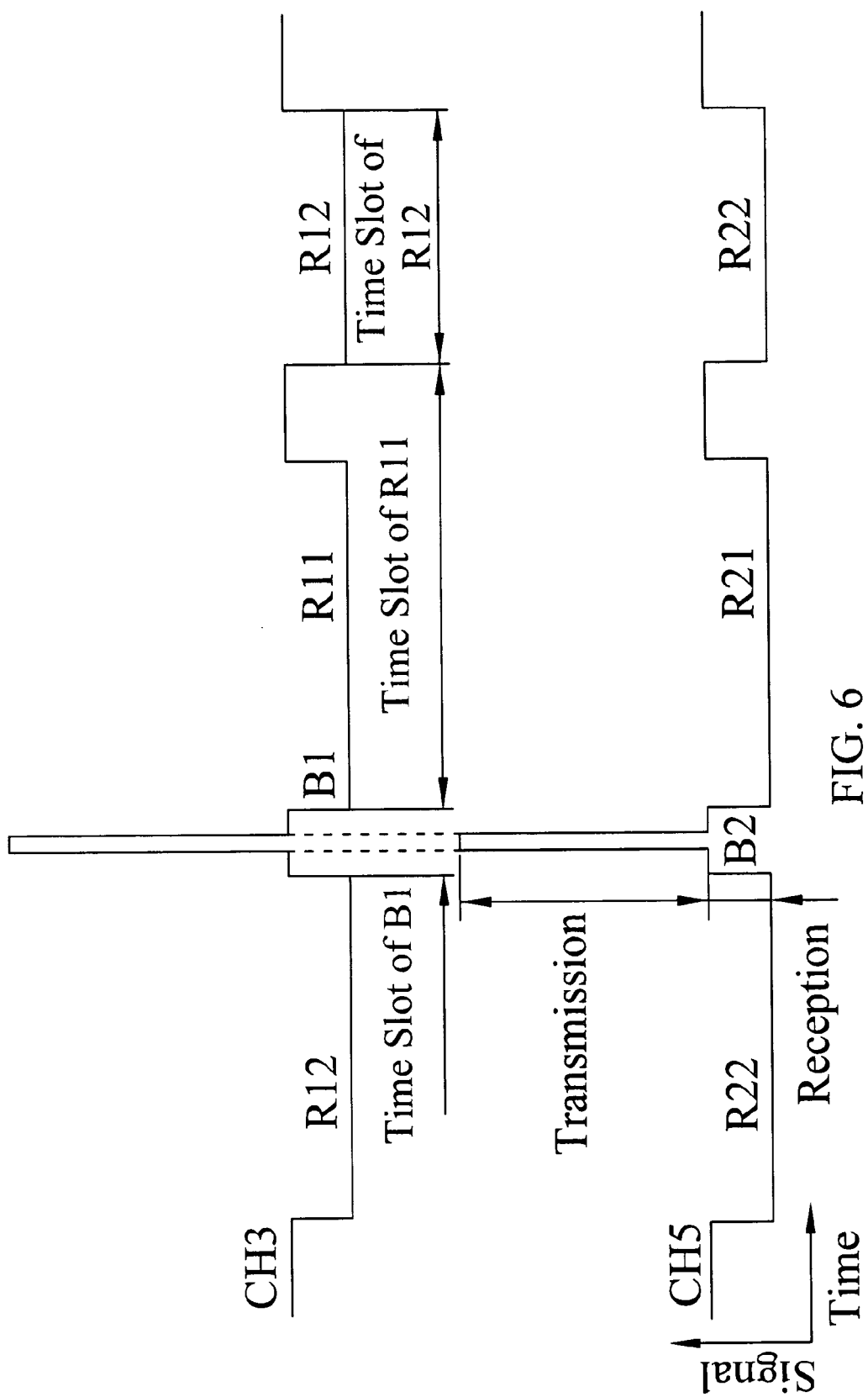

Referring to FIG. 3, the first base station BS1 is communicated with wireless microphones C11, C12, and the second base station BS2 is communicated with wireless microphones C21, C22. Further, the first base station BS1 and the second base station BS2 are located in the channel 3 CH3 and the channel 5 CH5, respectively. When the first base station BS1 and the second base station BS2 are closed to each other, the first base station BS1 and the second base station BS2 will be interfered with each other due to time differences of transmitting beacons. Wherein, the number of the wireless microphones is two in the present embodiment, number of the wireless microphones may be varied according to the demands of the user and should not be construed as limited to the embodiments set forth herein. Referring to FIGS. 4-6, the first base station BS1 transmits beacon B1 and receives wireless signals R11, R12, and the second base station BS2 transmits beacon B2 and receives wireless signals R21, R22. The beacon B2 transmitted by the second base station BS2 interferes the wireless signal R11 received by the first base station BS1. Thus, the correction mechanism is activated by the first base station BS1 to synchronize the beacon B1 transmitted by the first base station BS1 with the beacon B2 transmitted by the second base station BS2.

Specifically, after detecting interference, the first stage of scanning is activated. The interfered first base station BS1 scans each channel that is available for the first base station BS1 at the time slot of receiving the wireless signal R11 to search for the beacon B2 transmitted by the second base station BS2 present in the wireless application range. In the time slot of receiving the wireless signal R12 and the beacon B1, the first base station BS1 would switch back to the original channel CH3 so that the normal work of receiving the wireless signal R12 would not be affected. Wherein, the scan is performed every beacon periods and performed on one channel at a time. Worth noting, interferences between two base stations are exemplified in the present embodiment. The number of the base stations may be varied according to the demands of the user and should not be construed as limited to the embodiments set forth herein.

Subsequently, when the first base station BS1 has found the interfering beacon B2 transmitted by the second base station BS2 in the channel 5 CH5, the first base station BS1 may calculate the time difference T1 between the beacon B1 transmitted by the first base station BS1 and the beacon B2 transmitted by the second base station BS2. Furthermore, the first base station BS1 may adjust the time of transmitting the beacon B1 so as to synchronize the time of transmitting the beacon B1 by the first base station BS1 and the time of transmitting the beacon B2 by the second base station BS2.

Preferably, after the synchronization, the first base station BS1 will switch to the channel 5 CH5 at the time slot of the beacon B1 every several beacon periods to fine tune the beacon B1 of the first base station BS1 to follow the beacon B2 of the second base station BS2. In addition, the first base station BSI may keep correcting the beacon B1 to maintain synchronization so that the first base station BS1 and the second base station BS2 may keep transmitting the beacons B1, B2 simultaneously without interfering with each other. When the second base station BS2 leaves or switches to other frequency, the first base station BS1 may not be able to find the second base station BS2 at the original channel 5 CH5. If the first base station BS1 can not find the second base station BS2 in several beacon periods, the second stage of scanning is activated.

The second stage of scanning is performed by the first base station BS1 to scan from the first channel, which is the lowest channel available to the first base station BS1, to the previous channel of the first base station BS1, namely, the channel 2 CH2, at the time slot of the beacon B1 to avoid multiple base stations synchronizing with each other. If the second base station BS2 is found to located in the channel 2, the first base station BS1 will switch to the channel 2 CH2 at the time slot of the beacon B1 every several beacon periods to fine tune the beacon B1 of the first base station BS1 to follow the beacon B2 of the second base station BS2. The first base station BS1 also scan from the highest channel frequency within the available channels of the base station to a next channel of the first base station BS1. Alternatively, the first base station BS1 may also scan from any specific channel to another channel and should not be construed as limited to the embodiments set forth herein.

When the first base station BS1 can not find the second base station BS2 at the second stage of scanning for several beacon periods, the correction mechanism and the synchronization of the first base station BS1 would be stopped to avoid multiple base stations synchronizing with each other. That is, the correction mechanism may be stopped and back to the normal state. Nevertheless, the correction mechanism and synchronization will be activated again when the wireless signals R11, R12 of the first base station BS1 are interfered by the beacons of other base stations.

Figure 7:
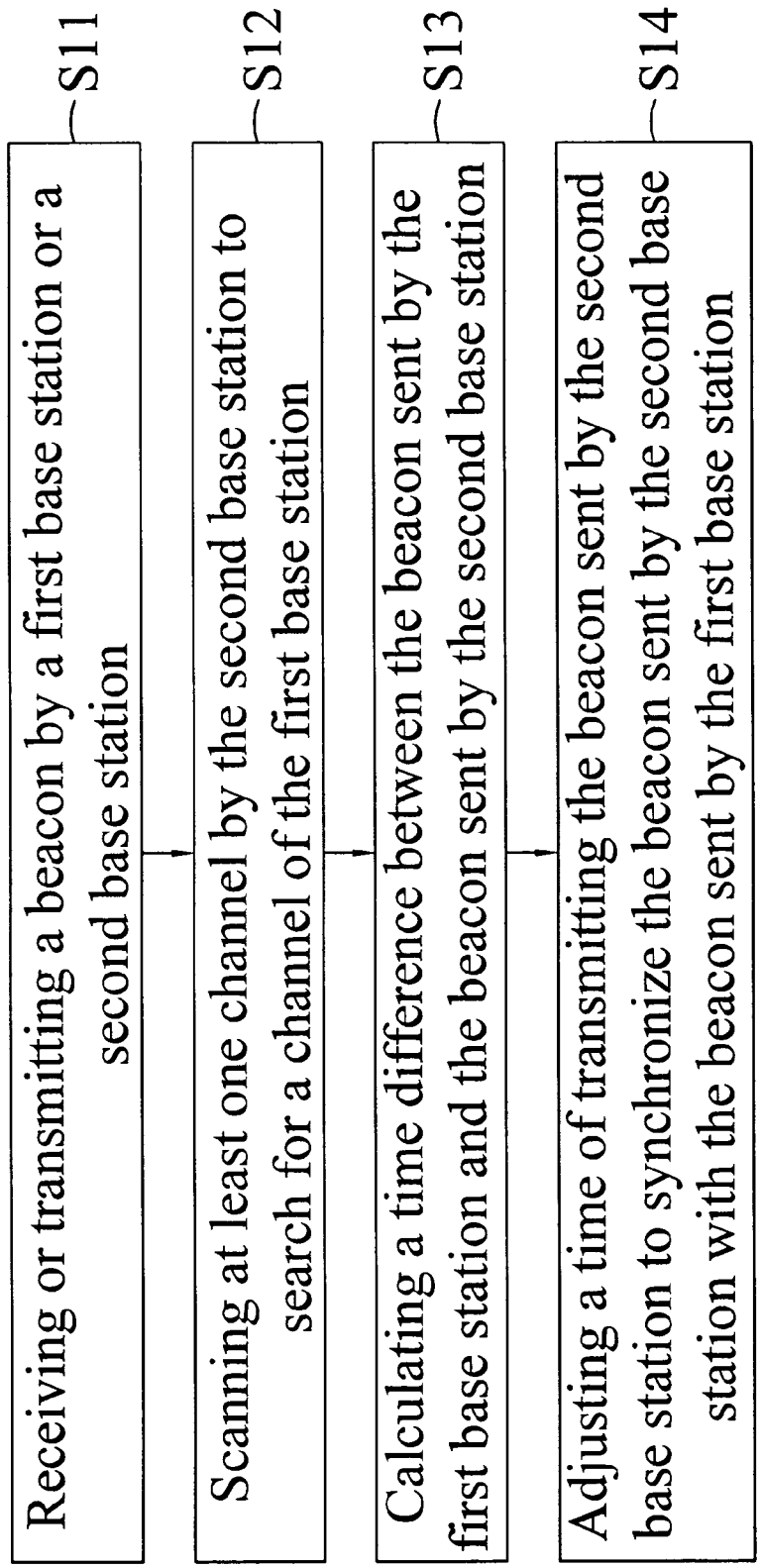
FIG. 7 is a flow chart of the method of beacon synchronization for base stations according to an embodiment of the present invention.

With reference to FIG. 7 for a flow chart of the method of beacon synchronization for base stations according to an embodiment of the present invention, the method comprises the following steps: Step S11: receiving or transmitting a beacon by a first base station or a second base station; S12: scanning at least one channel by the second base station to search for a channel of the first base station; S13: calculating a time difference between the beacon sent by the first base station and the beacon sent by the second base station; and S14: adjusting a time of transmitting the beacon sent by the second base station to synchronize the beacon sent by the second base station with the beacon sent by the first base station.

Figure 8:
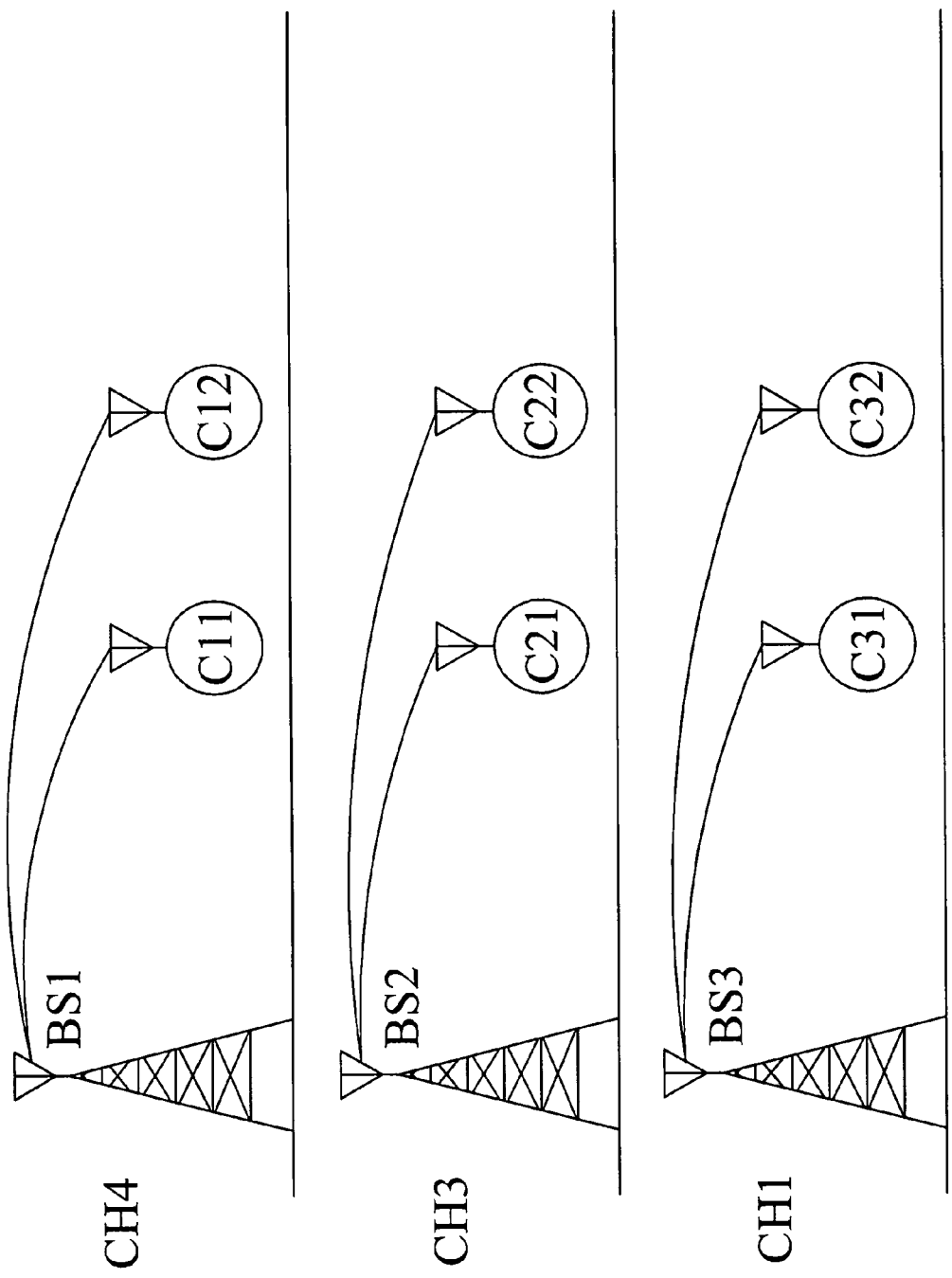
FIG. 8 is a schematic diagram of the method of beacon synchronization for base stations according to another embodiment of the present invention.
Figure 9:
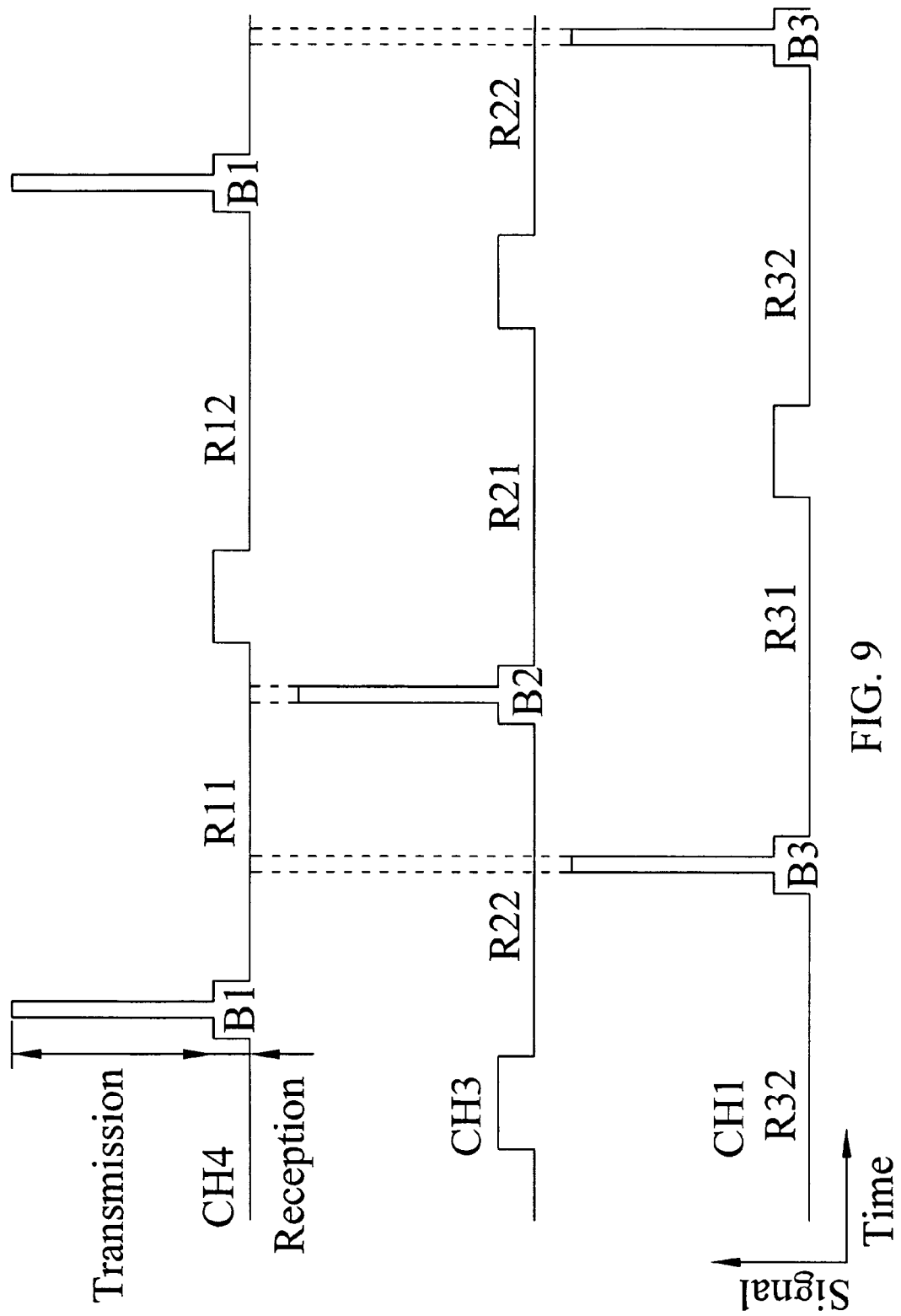
FIGS. 9-10 are schematic diagrams of the steps of the method of beacon synchronization for base stations according to another embodiment of the present invention.
Figure 10:
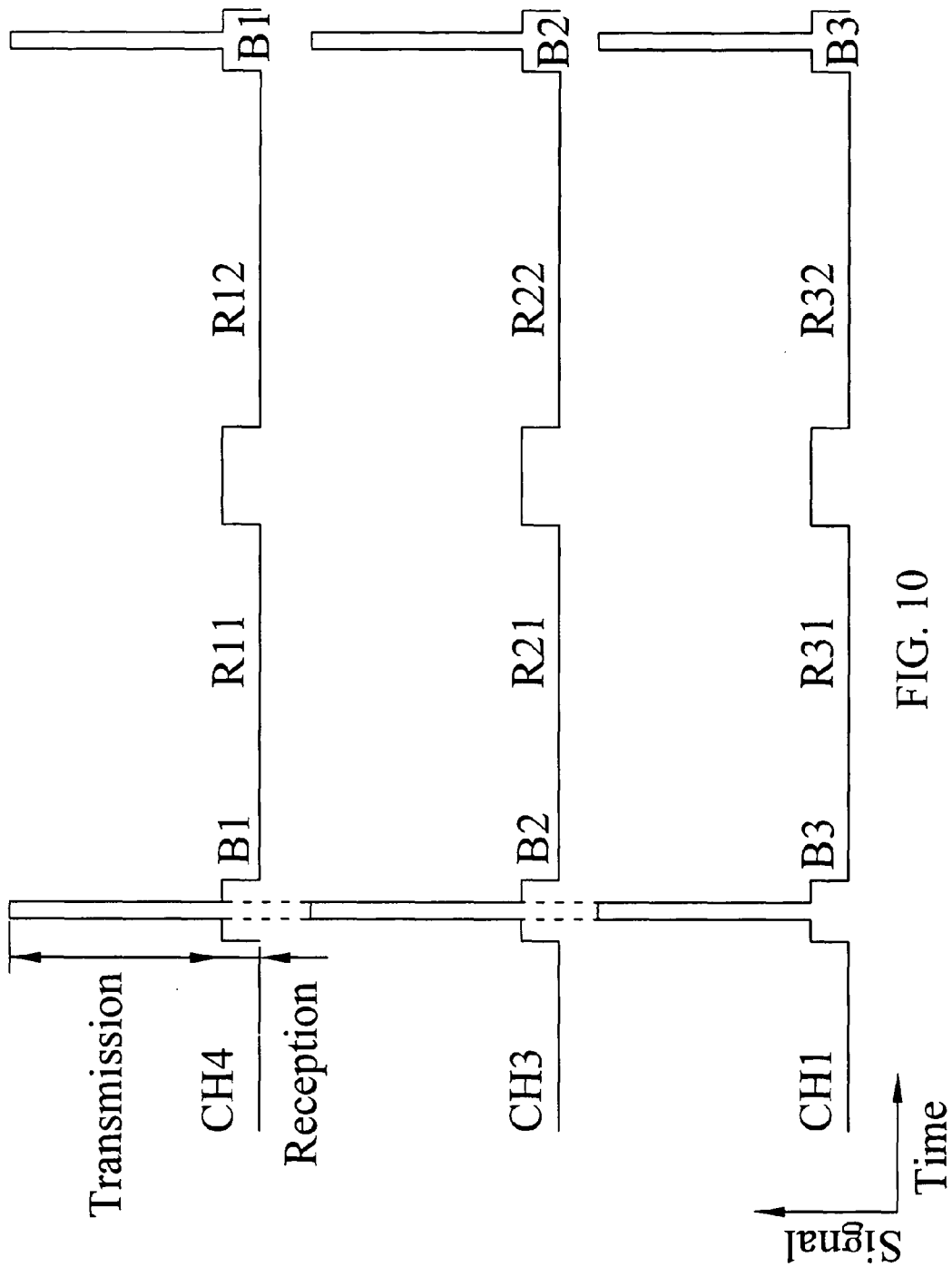

In another embodiment, with reference to FIGS. 8-10 for schematic diagrams of the method of beacon synchronization for base stations and the steps of the method according to another embodiment of the present invention, in order to avoid multiple base stations synchronizing with each other, the above mentioned method may be applied. The correction mechanism and synchronization are similar to the embodiment mentioned above. Briefly, when the third base station in the wireless application range, the above mentioned correction mechanism and synchronization may be activated. Thus, the base station may correct the time of transmitting the beacon to be synchronized with one of the base stations, so that the condition of multiple base stations synchronizing with each other may be avoided.

The aforementioned descriptions are simply illustrative, rather than being restrictive. All effectively equivalent modifications, changes or substitutions made thereto without departing from the spirit and scope of the present invention are deemed as being included by the claims set forth hereunder.

What is claimed is:

1. A method of beacon synchronization for base stations, comprising the following steps:

receiving or transmitting a beacon by a first base station or a second base station;

scanning at least one channel by the second base station to search for a channel of the first base station;

calculating a time difference between the beacon sent by the first base station and the beacon sent by the second base station; and adjusting a time of transmitting the beacon sent by the second base station to synchronize the beacon sent by the second base station with the beacon sent by the first base station;

wherein a wireless signal of the second base station is interfered by the first base station;
wherein the step of scanning is performed every a plurality of beacon periods.

2. The method of beacon synchronization for base stations according to claim 1, wherein the method of beacon synchronization is stopped in response to no beacon being found by the second base station in a consecutive search for predetermined beacon periods.

3. The method of beacon synchronization for base stations according to claim 1, wherein a channel frequency of the first base station is lower or higher than a channel frequency of the second base station.

4. The method of beacon synchronization for base stations according to claim 3, wherein the step of scanning is scanned from the channel with a lowest channel frequency to the channel with a highest channel frequency in the at least one channel.

5. The method of beacon synchronization for base stations according to claim 1, further comprising a step of confirming and tuning a synchronization between the beacon of the first base station and the beacon of the second base station every predetermined beacon periods after the beacon sent by the second base station being synchronized with the beacon sent by the first base station.

6. The method of beacon synchronization for base stations according to claim 5, wherein the second base station checks the presence of the first base station at the channel frequency of the first base station in response to that the first base station leaves or switches to another channel frequency.

7. The method of beacon synchronization for base stations according to claim 6, further comprising a step of scanning from a channel of the second base station to another channel of the second base station in response to that the second base station is not capable of finding the first base station in the predetermined beacon periods.

8. The method of beacon synchronization for base stations according to claim 7, further comprising a step of scanning from a channel with the lowest channel frequency available for the second base station to a previous channel of the second base station in response to that the second base station is not capable of finding the first base station in the predetermined beacon periods.

9. The method of beacon synchronization for base stations according to claim 7, further comprising a step of scanning from a channel with the highest channel frequency available for the second base station to a next channel of the second base station in response to that the second base station is not capable of finding the first base station in the predetermined beacon periods.

* * * * *